United States Patent [19]

Reiser et al.

[11] 4,202,933
[45] May 13, 1980

[54] METHOD FOR REDUCING FUEL CELL OUTPUT VOLTAGE TO PERMIT LOW POWER OPERATION

[75] Inventors: Carl A. Reiser, Glastonbury; Michael B. Landau, West Hartford, both of Conn.

[73] Assignee: United Technologies Corporation, Hartford, Conn.

[21] Appl. No.: 951,421

[22] Filed: Oct. 13, 1978

[51] Int. Cl.² .............................................. H01M 8/04
[52] U.S. Cl. ........................................ 429/13; 429/17
[58] Field of Search .................................. 429/17, 13

[56] References Cited

U.S. PATENT DOCUMENTS

| 3,379,572 | 4/1968 | Gay ........................................ 429/13 |
| 3,994,748 | 11/1976 | Kunz ...................................... 429/13 |
| 4,041,210 | 8/1977 | Van Dine ............................... 429/17 |

Primary Examiner—Donald L. Walton
Attorney, Agent, or Firm—Stephen E. Revis

[57] ABSTRACT

Fuel cell performance is degraded by recycling a portion of the cathode exhaust through the cells and, if necessary, also reducing the total air flow to the cells for the purpose of permitting operation below a power level which would otherwise result in excessive voltage.

6 Claims, 4 Drawing Figures

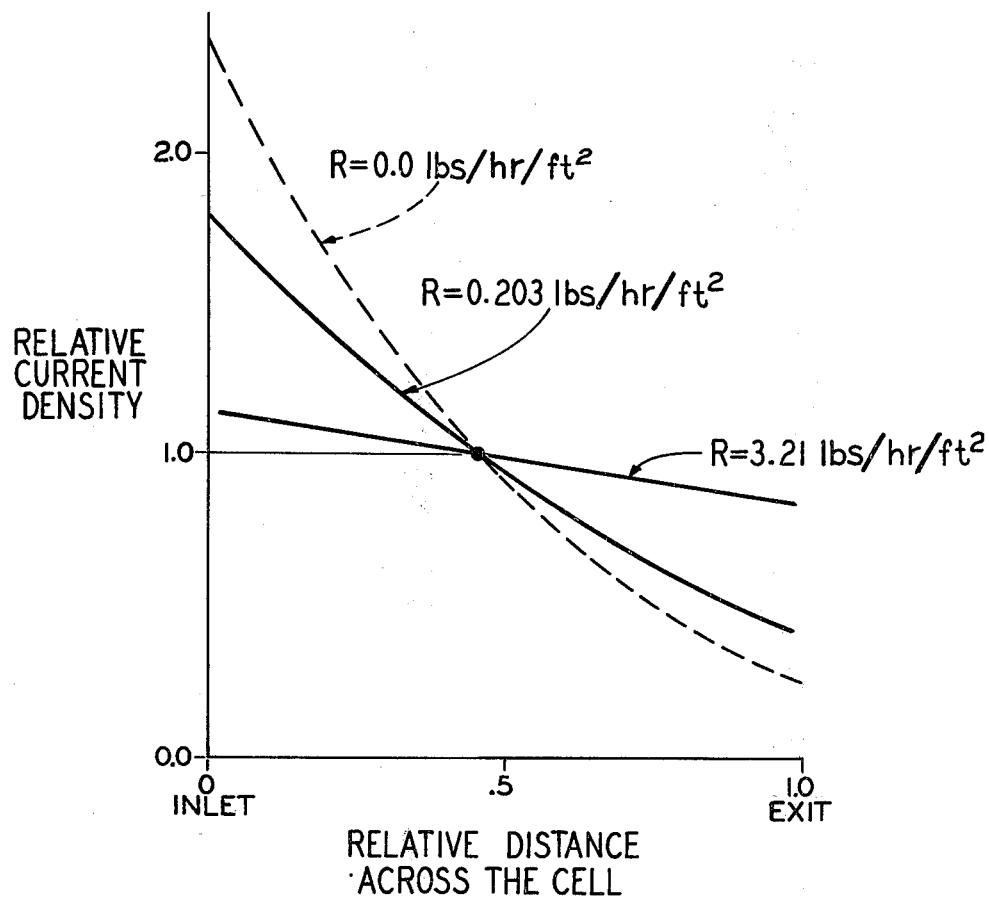

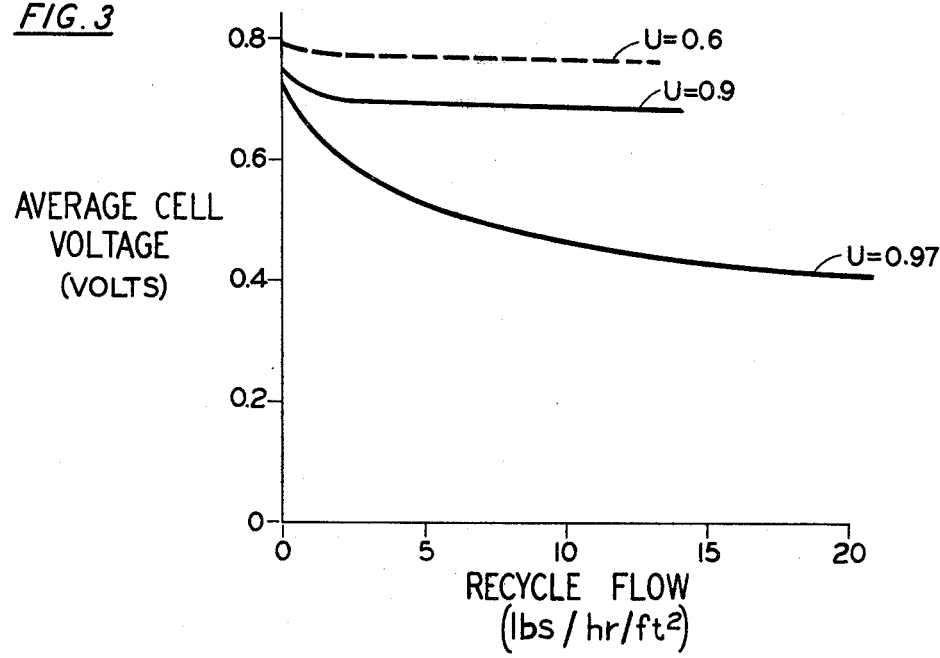
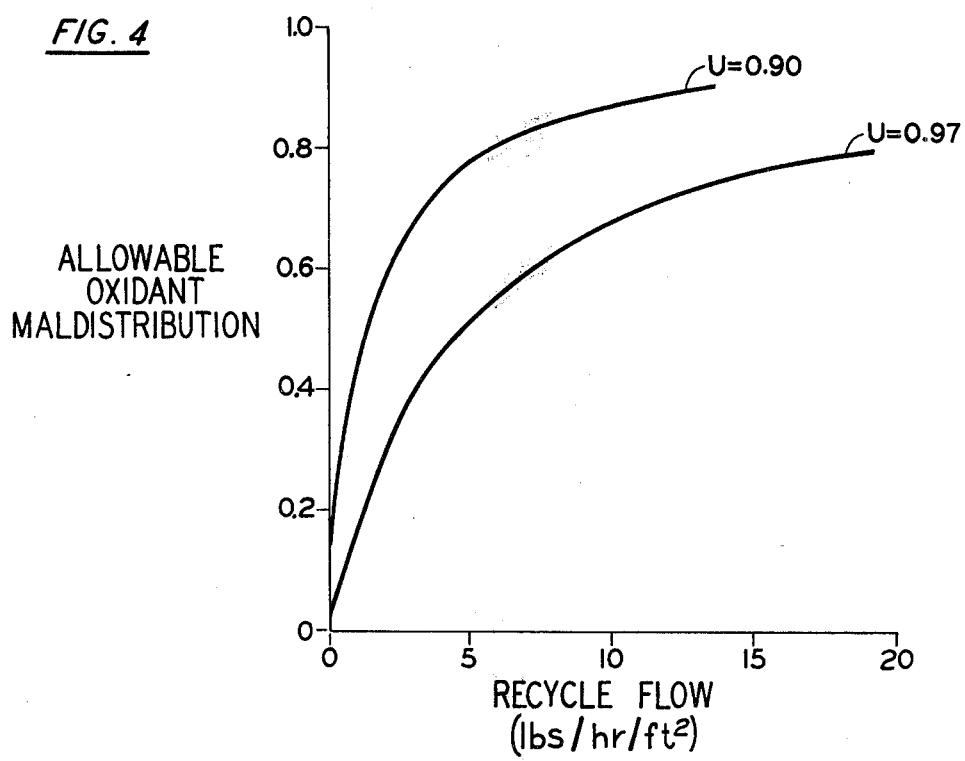

METHOD FOR REDUCING FUEL CELL OUTPUT VOLTAGE TO PERMIT LOW POWER OPERATION

The Government has rights in this invention pursuant to Contract No. EX-76-C-01-2102 awarded by the Department of Energy.

BACKGROUND OF THE INVENTION

1. Field of the Invention

This invention relates to fuel cell power plants and more particularly to the operation of fuel cell power plants at low power levels.

2. Description of the Prior Art

Typical fuel cell power plants comprise one or more stacks of fuel cells, the cells within a stack being connected electrically in series. They operate using air to provide oxygen to the cathode and hydrogen to provide fuel to the anodes. After passing through the cells the depleted reactant streams are vented from the system on a continuous basis. Depending upon the size of the power plant, a stack of fuel cells may comprise a half dozen cells or less, or as many as several hundred cells. The air and fuel are usually fed to the cells by one or more manifolds per stack. The cell components are designed to operate within a predetermined voltage band. Voltage above a predetermined maximum must be prevented since excessive voltage can damage external equipment and cause excessively fast corrosion of the cell components particularly the cathodes.

Power output is controlled by varying the load impedance on the cell stack terminals. During periods of relatively high power output, such as when the power plant is operating at or near full power, the fuel flow, air flow, and cell temperature are adjusted as required along "normal" operating curves. These normal operating curves provide a large excess of air such that only about 60 or 70% of the oxygen in the air supplied to the cells is consumed by the cells. (The amount of oxygen consumed by the cells divided by the total amount of oxygen in the air supplied to the cells is hereinafter referred to as the oxygen utilization (U) of the cells.) Normal operating curves are designed to maintain the average cell voltage near or at the maximum permissible in order to obtain peak power plant efficiency. As power is reduced a point will eventually be reached when the normal operating curves cannot maintain the voltage below the permitted maximum voltage. In this specification power levels below this point are referred to as "low" power levels. To operate at these low power levels steps must be taken to reduce the voltage. This is done by degrading cell performance. Obviously it is preferable to do this as cost effectively as possible and without causing serious harm to the power plant components.

One known method for reducing the voltage at low power levels is to reduce the fuel partial pressure to the anode. Commonly owned U.S. Pat. No. 3,379,572 to M. A. Gay describes a hydrogen-oxygen fuel cell system which uses this approach. The fuel cell system of Gay is a closed system, with venting of the reactant stream occurring only occasionally to purge the system of undesirable constituents. During normal operation an excess of pure hydrogen is fed to the anode, and the anode exhaust is continuously recirculated through the cell with makeup fuel being added as the hydrogen is used by the cell. The hydrogen also serves the purpose of carrying away the water produced in the cell. This water is removed from the recirculating anode exhaust stream by a pump separator. Gay cannot reduce the voltage (at low power levels) by merely reducing fuel (hydrogen) flow to the cells because, as is stated, the reduced hydrogen flow would be insufficient to remove all the product water from the cell resulting in dilution of the electrolyte. To solve this problem, instead of reducing the hydrogen flow rate Gay adds a quantity of inert gas (nitrogen) to the recirculating hydrogen stream. This quantity of inert gas now recirculates along with the excess hydrogen during low power level operation, reduces the hydrogen partial pressure, and enables the recirculating stream to carry away the water generated in the fuel cell. As with higher power level operation, pure hydrogen is added to the recirculating anode exhaust as required to make up for the hydrogen used by the cell and to maintain the pressure balance across the cell. When the fuel cell is returned to normal power level operation the recycling anode exhaust stream is vented to get rid of the inert gas. Eventually the recycle stream returns to its normal composition which is basically hydrogen.

The method shown in the Gay patent is limited in its usefulness to non-vented oxygen-hydrogen fuel cells which are not economically suited to large scale power generating systems. It is not suitable for use in the air-hydrogen vented fuel cell system hereinabove discussed and which is the subject matter of the present invention. Furthermore, the method taught by Gay for reducing output voltage at low power levels has little effect on preventing cathode corrosion since it works by increasing the anode potential rather than by lowering the cathode potential.

SUMMARY OF THE INVENTION

It is an object of the present invention to permit operation of a fuel cell power plant at low power levels as efficiently as possible and with the least amount of harm to the fuel cells.

It is another object of the present invention to provide a method for reducing the voltage output of an air-hydrogen fuel cell wherein both reactant streams are continuously vented.

A further object is to reduce fuel cell voltage output without significantly increasing cathode corrosion.

Accordingly, in an air-hydrogen fuel cell wherein the reactant streams are continuously vented from the system the output voltage of the cell is reduced by recycling a portion of the cathode exhaust through the cell. In a preferred embodiment the voltage is further reduced by both reducing the total air flow to the cell and recycling a portion of the cathode exhaust through the cell.

In an effort to minimize undesirable effects on the operation of the power plant, it is preferable (but not required) to initially reduce the voltage by decreasing the operating temperature of the cells; however, the temperature can only be reduced by a relatively small amount without resulting in cell performance instability and a loss of desirable thermal and electrical characteristics within the power plant. Thus, only a small reduction in power level can be achieved by this procedure alone.

In accordance with the teachings of the present invention, if the power level must be reduced further a portion of the cathode exhaust should be recycled. Since the cathode exhaust is more dilute in oxygen than is air, recycling has the effect of reducing the average partial pressure of oxygen within each cell thereby causing a reduction in voltage. The power level may then be reduced until the voltage returns to the permitted maximum. As will be hereinafter explained, recycling is not without its penalties; and, for each set of operating parameters there will always be a rate of recycle beyond which the penalties begin to outweigh the advantages. At this point, if the actual power level is still above the desired power level and the voltage is at the maximum permitted, a further voltage drop is obtained by reducing the total air flow to the cells (i.e., increasing oxygen utilization). This step is also not without its penalties, and air flow should not be reduced beyond the point where penalties begin to outweigh the advantages, as will also be hereinafter more fully explained. In any event, one advantage of the present invention is that the steps taken reduce voltage by decreasing cathode potential, and this minimizes cathode corrosion.

If ultimately the recycle flow rate has been increased to a predetermined allowable maximum and the air flow rate has been reduced to a predetermined allowable minimum, and if the desired power is still lower than the actual power, a further reduction in the power level is simply not permitted.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIGS. 2 through 4 are graphs showing the relationship between various parameters of a fuel cell power plant.

DESCRIPTION OF PREFERRED EMBODIMENTS

Figure 1:
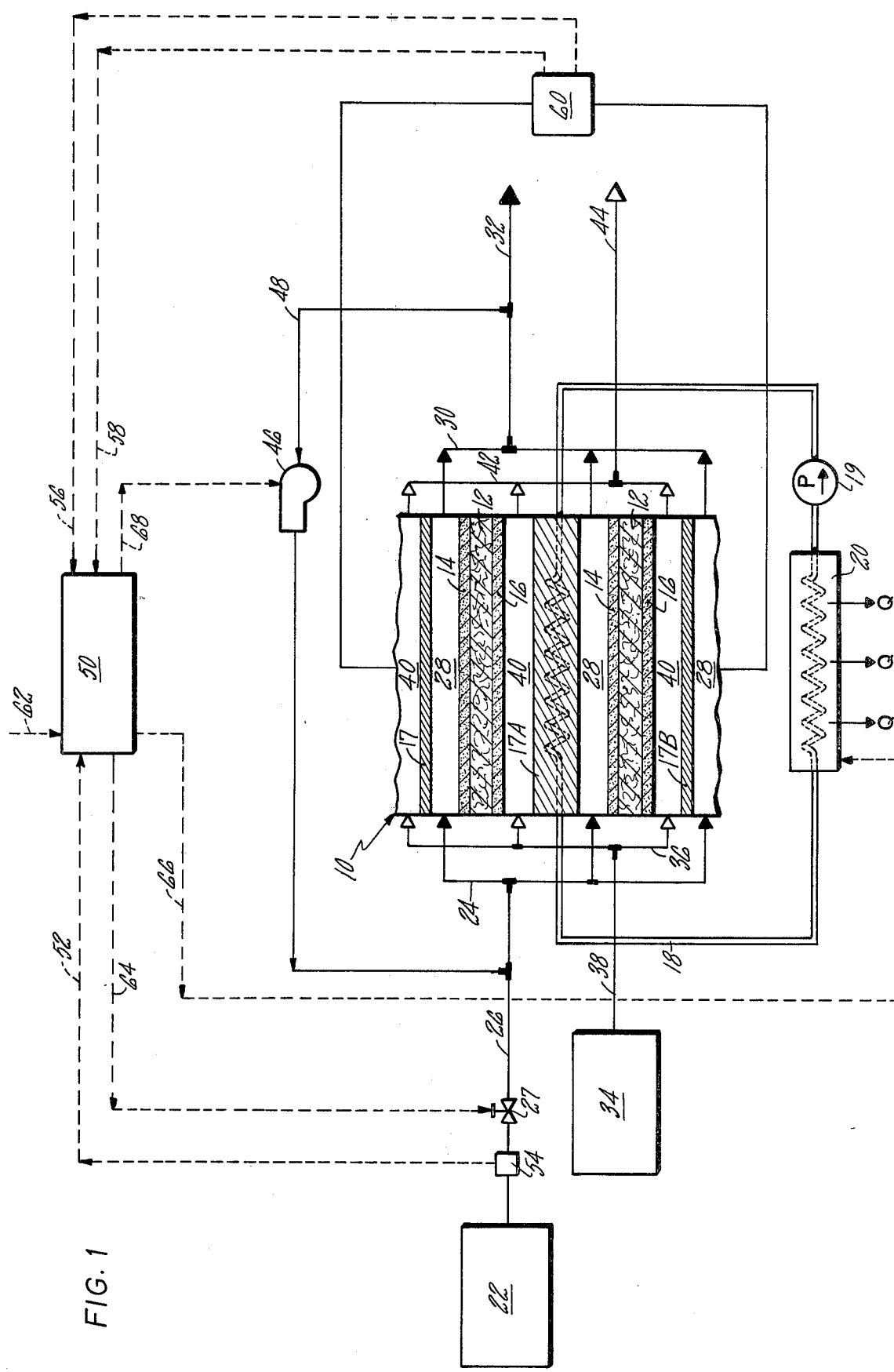
FIG. 1 is a partially schematic block diagram representing part of a fuel cell power plant which operates according to the method of the present invention.

Referring to FIG. 1, a portion of a fuel cell power plant is shown. A fuel cell stack comprising a plurality of cells electrically connected in series is represented by the reference numeral 10; however, only two complete cells are shown for clarity. Each cell comprises a silicon carbide matrix 12 which is soaked with phosphoric acid electrolyte. The matrix 12 is sandwiched between a cathode or oxidant electrode 14 and an anode or fuel electrode 16. Gas impervious plates 17, 17A, 17B separate adjacent cells in the stack 10. Heat may be removed from the stack by passing a coolant fluid through one of these plates. In the drawing the plate 17A is shown schematically as having a coolant fluid flowing therethrough via a conduit 18. The fluid is circulated by a pump 19; and the heat which is picked up in the cells is rejected to atmosphere or is transferred to other areas of the power plant by a heat exchanger 20.

Air from a source 22 is supplied to a manifold 24 via a conduit 26. The air flow rate is controlled by a valve 27 in the conduit 26. The manifold 24 directs the air to air passages 28 adjacent the cathode electrodes 14 of each cell. Exhaust from the air passages 28 (hereinafter referred to as the cathode exhaust) enters a manifold 30 and is vented from the stack via a conduit 32. Fuel such as hydrogen from a fuel source 34 is supplied to a manifold 36 via a conduit 38. The manifold 36 directs the fuel to fuel passages 40 adjacent the anode electrodes 16. Exhaust from the fuel passage is vented from the stack via a manifold 42 connected to a conduit 44. The reader is referred to commonly owned U.S. Pat. No. 3,994,748 to H. R. Kunz and C. A. Reiser (incorporated herein by reference) for a more detailed description of a manifolded stack of fuel cells suitable for use with the method of the present invention.

A blower 46 in a conduit 48 serves to recycle a portion of the cathode exhaust. In this embodiment the blower is either on or off and therefore provides only a single rate of recycle flow.

A control 50, which includes a computer, receives a variety of signals upon which it acts to control a variety of operations within the power plant. It receives a signal 52 from an air flow meter 54 which tells it how much air is being supplied to the stack 10. Signals 56, 58 from a measuring device 60 tell the controller 50 the current output and the actual power output of the stack 10. From the current output and air flow rate the control can calculate the oxygen utilization of the cells. A signal 62 tells the control 50 the desired power output. The control 50 continuously compares the actual and desired power output. Also, in accordance with the present invention the control 50 operates the air flow valve 27, the heat exchanger 20, and the recycle blower 46 by means of signals 64, 66, and 68, respectively.

In operation, electrical power conditioning apparatus (including such equipment as an inverter) which is not shown increases and decreases the power output upon demand by changing the load impedance on the cell stack terminals. When the voltage reaches a predetermined maximum the apparatus will no longer continue to reduce the power. At this point the control 50 will have calculated that the desired power is less than the actual power, and it sends a signal 66 to the heat exchanger 20 whereby additional heat is extracted from the coolant fluid in the conduit 18 such that the fluid entering the cells is at a lower temperature. The fluid is thereby able to remove additional heat from the cells and the average cell operating temperature is reduced. The reduced operating temperature results in a reduced voltage output. As the voltage drops below the predetermined maximum the power conditioning apparatus again automatically lowers the actual power output until either the desired power is reached or the maximum voltage is again reached.

The control 50 compares the new actual power with the desired power, and if the actual power is the same as the desired power no additional steps are taken. If the actual power is still greater than the desired power and no further cell temperature reduction is tolerable the recycle blower 46 is turned on via the signal 68. This results in a voltage drop and once again permits the power conditioning apparatus to reduce the actual power output until either the desired power level or the maximum voltage is reached.

The control 50 again compares the desired power and the actual power. If the actual power is still greater than the desired power then a signal 64 is sent to the air flow valve 27 to decrease the air flow. This causes the oxygen utilization to rise and lowers the average cell voltage. Once again, as the voltage is reduced the power conditioning apparatus further reduces the power level. The control 50 continues to compare the actual power and the desired power and to reduce the air flow to the cells until either the desired power is achieved or until the maximum allowable oxygen utilization is reached.

The maximum allowable oxygen utilization is generally the oxygen utilization which results in the lowest acceptable single cell output voltage. If at this point the desired power is still not achieved a signal is sent to an operator telling the operator that the lowest possible power has been achieved and no further reductions in the power output will be possible.

In this preferred embodiment the initial voltage reduction is obtained by reducing the average cell operating temperature. Since only a small voltage reduction can usually be obtained by this step, in some instances it may be desired or even preferable not to make any temperature changes and to simply turn on the recycle blower 44 as the first step in the present procedure.

Also, in this embodiment, the recycle blower is either on or off while the air flow is reduced on a continuum. There is no reason why the recycle blower cannot be a variable speed blower such that the control 50 can vary the amount of recycle on a continuum. Along these same lines, there is no reason why the control 50 cannot be programmed to simultaneously or individually vary the cathode exhaust recycle flow rate and the air flow rate in accordance with a predetermined schedule. Theoretically the ultimate goal is to select the best combination of recycle flow rate and air flow rate at each operating point so as to achieve the best possible compromise between power plant efficiency and power plant life under what would generally be considered to be adverse operating conditions. However, the cost of controls to implement such a program may be prohibitive. What follows is a more detailed discussion of the factors which should be considered in controlling the variables involved in the method of the present invention.

FIG. 2 shows the effect of cathode exhaust recycle flow rate (R) on current density maldistribution across a cell. Current density maldistribution is the ratio of the current density at the air inlet of the cathode to the current density at the exit of the cathode. Current density maldistribution is harmful in that it creates temperature maldistribution which results in local hot spots within the cell. The current density maldistribution should be low enough such that local maximum temperatures within the cells do not exceed allowable material limits. Along the vertical axis of FIG. 2 relative cell current density is plotted. The average cell density is given the arbitrary value of 1.0. On the horizontal axis 0.0 is the cell cathode gas inlet and 1.0 is the cell cathode gas exit. The data is plotted for an overall oxygen utilization (U) of about 0.9 and an air flow rate of 0.145 lbs/hr per square foot of cell. Since overall oxygen utilization under normal operating conditions is between about 0.6 and 0.7, an overall oxygen utilization of 0.9 means that the air flow rate to the cells has been considerably reduced in accordance with the broad teaching of the present invention. The dotted line is an approximation of no recycle flow. The two solid lines represent recycle flow rates of about 0.203 lbs/hr per square foot of cell and 3.21 lbs/hr per square foot of cell. It is apparent from FIG. 2 that the higher the recycle flow rate the more uniform the current density across the cell. With no recycle flow there is about a 10:1 difference between the current density at the inlet and at the exit (i.e., the current maldistribution is 10.0). With a recycle flow rate of 0.203 lbs/hr/ft$^2$ the current density maldistribution is only about 4.5. With a recycle flow rate of 3.21 lbs/hr/ft$^2$ the current maldistribution drops to less than 1.4. For most applications it is desirable that the current maldistribution be no greater than 3.0 and most preferably no greater than 2.0. Note that the recycle flow rate has no effect on the average current density of a cell.

For a cell to provide a specified average current density it is necessary for it to consume a certain amount of oxygen, other parameters being equal. In the system used to provide the graph of FIG. 2 wherein U=0.9, each square foot of cell is always consuming about 0.0313 pounds of oxygen per hour but is being fed with only about 0.0348 pounds of oxygen per hour. If the cell were instead operating at an overall oxygen utilization of, for example, 0.6, each square foot would be receiving about 0.0521 pounds of oxygen per hour to do the same job. In the latter case, because there is so much excess oxygen at the cathode inlet there is still plenty of oxygen at the cathode exit, and the ratio of the inlet to exit current density would be only about 2:1 even with no recycle. With the 0.9 oxygen utilization of FIG. 2, without recycle there is plenty of oxygen for the inlet but little remains at the exit. In order for the cell to produce the demanded average current density the inlet portion of the cell becomes overworked at the expense of the exit portion. Thus, it is only at high oxygen utilizations that non-uniformity of current density distribution is serious.

Because the cathode exhaust is more dilute in oxygen than the air feed, recycling a portion of the cathode exhaust has the effect of reducing the concentration of oxygen entering the cathode. As a result of the reduced oxygen concentration at the inlet, the portion of the cathode nearest the inlet is not able to consume as large a proportion of the oxygen in the gas stream as would be the case with a higher oxygen concentration. This leaves more oxygen for the exit portion of the cathode. Recycle therefore results in lowering the current density at the inlet and increasing the current density at the exit. Actually, it is quite impractical to significantly reduce air flow to the cells without at least some recycle to compensate for the current density maldistribution which would otherwise occur.

In FIG. 3 the average cell voltage is plotted against the cathode exhaust recycle flow rate per square foot of cell. FIG. 3 clearly shows that a voltage drop results from reducing the air flow rate. The dotted line is representative of more normal air flow conditions, such as an overall oxygen utilization of 0.6. Note that at U=0.6 increasing the recycle flow rate can only produce a small voltage drop. Therefore, to achieve significantly lower power levels it is also necessary to increase the oxygen utilization. For most applications the oxygen utilization will have to be increased to at least 0.85 and more likely at least 0.9 in order to reach the lowest required power levels with reasonable recycle flow rates.

FIG. 4 is helpful in understanding another factor which should be taken into consideration when optimizing the method of the present invention. In a commonly manifolded group of cells (which may be, for example, an entire stack or a portion of the stack of cells) even at high power levels with a large excess of air flowing via the manifold to the cells it is not possible to ensure that every cell in the group will receive the same mass flow rate of oxidant. The difference between the average oxidant flow rate and the oxidant flow rate through the cell receiving the least flow is called the oxidant maldistribution. In FIG. 4 the tolerable or allowable oxidant maldistribution is expressed as a fraction of the average mass flow rate through the cells and is plotted against recycle flow rate for two different oxygen utilizations. The curves are developed by assuming that the allowable oxidant maldistribution occurs when the cell receiving the minimum flow is consuming 100% of the oxygen being supplied to it (i.e., U=1.0). Note that both lower oxygen utilizations (i.e., higher air flow rates) and higher recycle flow rates result in a higher allowable oxidant maldistribution. Since with fixed parameters achieving a lower oxidant maldistribution requires designing and building the cell stack with closer tolerances, it is desirable to have a high allowable oxidant maldistribution. To permit the design and fabrication of a fuel cell stack at a reasonable cost it is believed that the allowable oxidant maldistribution must be at least 0.15 and is preferably at least 0.25. Once a minimum allowable oxygen maldistribution is selected, then any combination of recycle flow rate and oxygen utilization may be used which results in an allowable oxidant maldistribution greater than the selected minimum.

There are several other perhaps secondary factors which are worthy of consideration when practicing the method of the present invention. For example, it takes power to recycle the cathode exhaust. The higher the recycle flow rate, the greater the power required. A point will be reached when the gains realized by a higher recycle flow rate are not worth the power needed to achieve them. This factor provides incentive to keep the recycle flow rate low. Also, in certain types of fuel cells, such as phosphoric acid fuel cells, very small amounts of electrolyte may evaporate into the reactant gas stream. Since the amount of electrolyte which is entrained in the cathode exhaust and which ultimately is lost from the system increases with increasing recycle flow, additional incentive is provided to keep the recycle flow rate low.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. In a method for permitting the lowering of the power output of a plurality of fuel cells when the average cell voltage at a present actual power output is at the maximum permitted, wherein the fuel cells are connected electrically in series and each cell includes an anode and a cathode wherein air as the oxidant is fed to the cathodes via a common manifold and hydrogen as the fuel is fed to the anodes and both the anode and cathode exhaust streams are continuously vented, and wherein means is provided to recycle a portion of the cathode exhaust stream to the cathodes, the steps of:

(1) comparing the desired power output to the actual power output and, if the desired power output is less than the actual power output, increasing the cathode exhaust stream recycle rate to lower the average cell voltage;

(2) decreasing the actual power output until the desired power output or the maximum permitted voltage is reached, whichever occurs first;

(3) comparing again the desired power output to the actual power output and, if the desired power output is still less than the actual power output, increasing the oxygen utilization of the cells by decreasing the rate of air flow to the cells to lower the average cell voltage; and (4) repeating steps (2) and (3) until either the actual power output equals the desired power output or until a maximum allowable oxygen utilization is reached.

2. The method according to claim 1 wherein for any power output the combination of the cathode exhaust stream recycle rate and the oxygen utilization of the cells results in a cell current maldistribution of no greater than 3.0.

3. The method according to claim 2 wherein at any power output the cathode exhaust stream recycle rate and the oxygen utilization of the cells results in an allowable oxidant maldistribution of at least 0.15.

4. The method according to claim 1 wherein the maximum allowable oxygen utilization is at least 0.85.

5. The method according to claim 1 including the following steps prior to step (1):

comparing the desired power output to the actual power output and, if the desired power output is less than the actual power output decreasing the operating temperature of the cells to lower the average cell voltage; and decreasing the actual power output until the desired power output or the maximum permitted voltage is reached, whichever occurs first.

6. In the method of operating a fuel cell power plant comprising a plurality of fuel cells connected electrically in series, each cell including an anode and a cathode, wherein air as the oxidant is fed to the cathodes via a common manifold and hydrogen as the fuel is fed to the anodes and both the anode and cathode exhaust streams are continuously vented, and wherein the average cell voltage at a present actual power output is at the maximum permitted and a lower power output is desired, the steps of:

reducing the average cell voltage by recycling a portion of the cathode exhaust stream to the cathodes and reducing the rate of air flow to the cathodes, wherein the recycle rate and air flow rate are selected to provide a cell current maldistribution no greater than 3.0, an allowable oxidant maldistribution of at least 0.15, and an oxygen utilization of at least 0.85; and then reducing the actual power output to the desired level or until the maximum permitted voltage is reached, whichever occurs first.

* * * * *